(12) United States Patent
Watanabe

(10) Patent No.: US 11,269,278 B2
(45) Date of Patent: Mar. 8, 2022

(54) IMAGE PROCESSING APPARATUS, IMAGE PROCESSING SYSTEM, METHOD, AND RECORDING MEDIUM

(71) Applicant: Ricoh Company, Ltd., Tokyo (JP)

(72) Inventor: Akiho Watanabe, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 17/167,131

(22) Filed: Feb. 4, 2021

(65) Prior Publication Data
US 2021/0247714 A1 Aug. 12, 2021

(30) Foreign Application Priority Data
Feb. 7, 2020 (JP) .............................. JP2020-020093

(51) Int. Cl.
*G03G 15/00* (2006.01)
*H04N 1/60* (2006.01)

(52) U.S. Cl.
CPC ..... *G03G 15/5062* (2013.01); *G03G 15/5041* (2013.01); *G03G 15/5054* (2013.01); *G03G 15/6582* (2013.01); *H04N 1/6027* (2013.01)

(58) Field of Classification Search
CPC ........... G03G 15/5041; G03G 15/5054; G03G 15/5062; G03G 15/6582; H04N 1/6027
See application file for complete search history.

(56) References Cited

U.S. PATENT DOCUMENTS

| | | | |
|---|---|---|---|
| 8,121,501 B2 * | 2/2012 | Mashiba | G03G 15/5062 399/45 |
| 8,947,742 B2 | 2/2015 | Nishida | |
| 10,460,217 B2 | 10/2019 | Sagimori et al. | |
| 10,477,068 B2 | 11/2019 | Sagimori et al. | |

FOREIGN PATENT DOCUMENTS

| | | |
|---|---|---|
| JP | 2013-026693 | 2/2013 |
| JP | 5618211 | 11/2014 |

* cited by examiner

*Primary Examiner* — Hoang X Ngo
(74) *Attorney, Agent, or Firm* — Xsensus LLP

(57) ABSTRACT

An image processing apparatus includes a read image obtaining unit configured to obtain read image data indicative of an image having been read, a target generation unit configured to generate, based on the read image data, target data indicative of a target color of a print medium, and a gradation correction unit configured to correct, based on the target data, a gradation of print image data indicative of an image to be formed.

9 Claims, 10 Drawing Sheets

IMAGE PROCESSING APPARATUS, IMAGE PROCESSING SYSTEM, METHOD, AND RECORDING MEDIUM

CROSS-REFERENCE TO RELATED APPLICATION

The present application is based on and claims priority under 35 U.S.C. § 119 to Japanese Patent Application No. 2020-020093, filed on Feb. 7, 2020, the content of which is incorporated herein by reference in its entirety.

BACKGROUND OF THE INVENTION

1. Field of the Invention

The present disclosure relates to an image processing apparatus, an image processing system, a method, and a recording medium.

2. Description of the Related Art

Techniques for correcting the gradation of a color used for printing by an image forming apparatus have been developed.

For example, Japanese Patent No. 5618211 discloses a technique for causing a sensor to read a print medium printed by an image forming apparatus and comparing the read color and the target color to bring the color of a print medium closer to the target color.

SUMMARY OF THE INVENTION

According to one aspect of the present disclosure, there is provided an image processing apparatus including a read image obtaining unit configured to obtain read image data indicative of an image having been read, a target generation unit configured to generate, based on the read image data, target data indicative of a target color of a print medium, and a gradation correction unit configured to correct, based on the target data, a gradation of print image data indicative of an image to be formed.

DETAILED DESCRIPTION OF THE PREFERRED EMBODIMENTS

Techniques for correcting the gradation of a color used for printing by an image forming apparatus have been developed.

For example, Japanese Patent No. 5618211 discloses a technique for causing a sensor to read a print medium printed by an image forming apparatus and comparing the read color and the target color to bring the color of a print medium closer to the target color.

In the conventional technique explained above, the target color is set in advance, and therefore, a color other than the color that has been set in advance cannot be specified as the target color. Therefore, it is desired to allow any color to be specified as the target color of the print medium.

First Embodiment

Hereinafter, an embodiment of an image forming apparatus according to the present disclosure is explained with reference to drawings.

Figure 1:
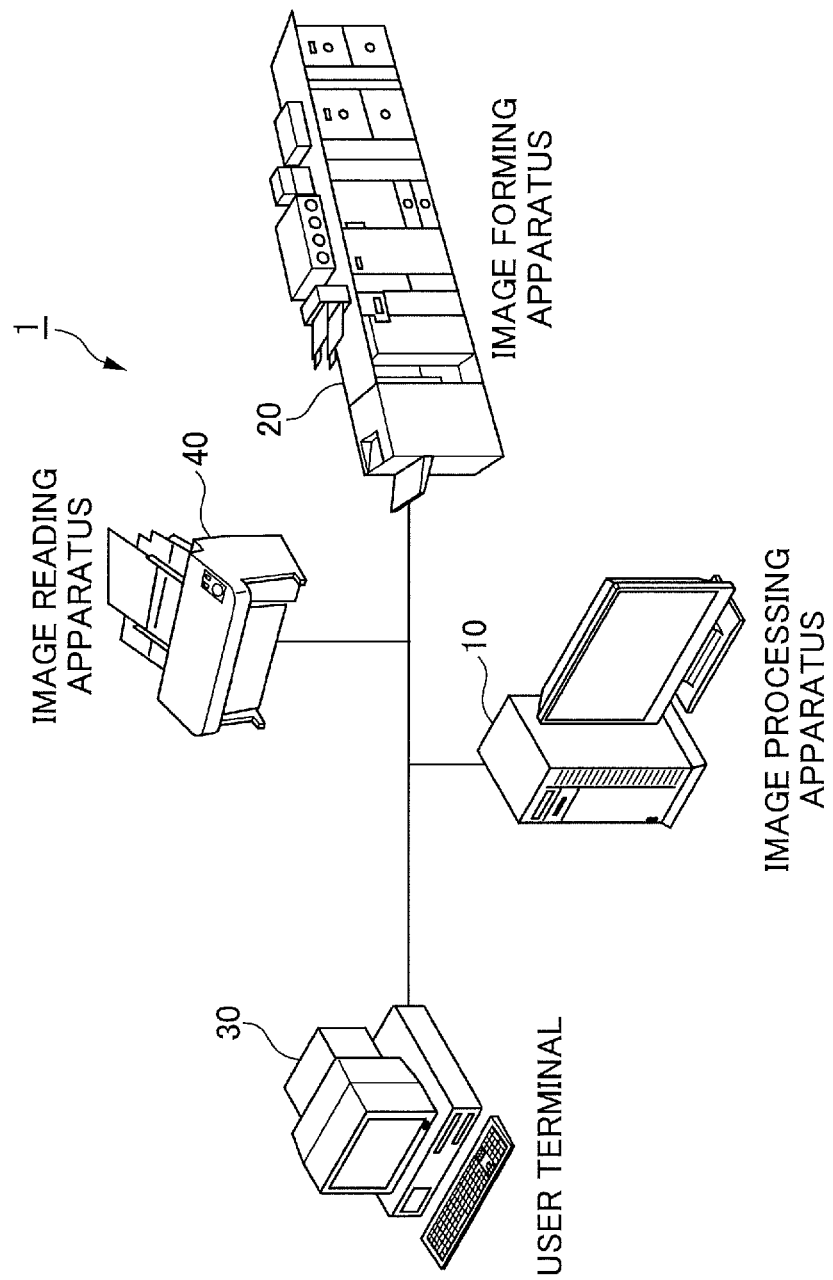
FIG. 1 is a drawing illustrating an example of a system configuration of an image processing system according to a first embodiment.

FIG. 1 is a drawing illustrating an example of a system configuration of an image processing system according to the first embodiment.

The image processing system 1 includes an image processing apparatus 10, an image forming apparatus 20, a user terminal 30, and an image reading apparatus 40.

The image processing apparatus 10 is an apparatus for controlling the image forming apparatus 20, and is, for example, a digital front end (DFE) and the like. The image processing apparatus 10 is communicably connected to the image forming apparatus 20, the user terminal 30, and the image reading apparatus 40.

When the image processing apparatus 10 receives image data and a signal for instructing printing of an image from the user terminal 30, a raster image processor (RIP) engine provided in the image processing apparatus 10 converts the received image data into image data of a format that can be processed by the image forming apparatus 20.

In addition, the image processing apparatus 10 executes processing for correcting the gradation of the color of the image data on the basis of the read image data transmitted from the image reading apparatus 40. Then, the image processing apparatus 10 transmits the corrected image data to the image forming apparatus 20.

The image forming apparatus 20 is an apparatus for forming an image, and is, for example, a color production printer. The image forming apparatus 20 receives the image data from the image processing apparatus 10, and forms an image on the basis of the received image data to print the formed image on a medium such as paper.

In addition, the image forming apparatus 20 has a function of conveying a print medium, and conveys the print medium to the reading region of the image reading apparatus 40.

In addition, the image forming apparatus 20 has a purge function for discharging the print medium to a different destination than a specified discharge destination, when the print medium read by the image reading apparatus 40 is not appropriate.

Note that the image forming apparatus 20 is an example of an image forming unit configured to form an image based on print image data.

The user terminal 30 is a terminal that gives instructions to print an image in response to user's operations. Specifically, the user terminal 30 sends job data including image data to the image processing apparatus 10.

The image reading apparatus 40 is an apparatus that is equipped with a spectroscopic sensor, an RGB scanner, and the like, to read an image. Specifically, the image reading apparatus 40 has a reading region on a conveyance path in which the image forming apparatus 20 discharges a print medium, on which an image has just been formed, to the tray. In addition, the image reading apparatus can also adopt, as the reading region, a tray or the like on which a user can place a color-calibrated document and the like.

The image reading apparatus 40 transmits the read image data indicative of the read image to the image processing apparatus 10. The image reading apparatus 40 may be provided in the image forming apparatus 20 as an in-line sensor and the like, or may be constituted by a plurality of reading apparatuses with different reading regions.

Note that the image reading apparatus 40 is an example of an image reading unit configured to read an image.

Figure 2:
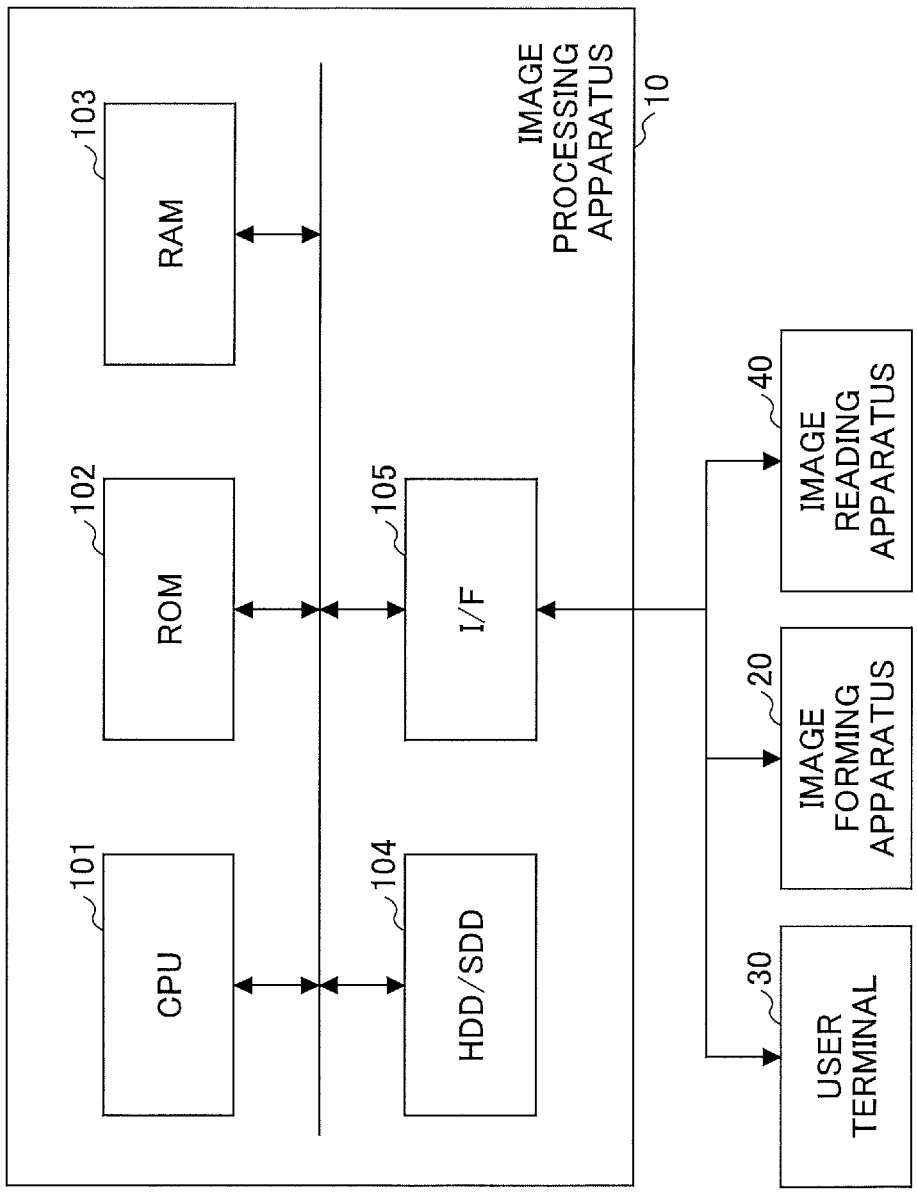
FIG. 2 is a drawing illustrating an example of a hardware configuration of an image processing apparatus according to the first embodiment.

FIG. 2 is a drawing illustrating an example of a hardware configuration of an image processing apparatus according to the first embodiment.

The image processing apparatus 10 is constituted by a computer and includes a central processing unit (CPU) 101, read only memory (ROM) 102, random access memory (RAM) 103, a storage drive 104, and an interface (I/F) 105, which are connected with each other via a bus.

The CPU 101 reads a program from the ROM 102 or the storage drive 104 and stores the program in the RAM 103. Then, the CPU 101 executes various processing described later according to the program stored in the RAM 103.

The ROM 102 is a non-volatile auxiliary storage device. The ROM 102 stores programs that specify basic operations of the image processing apparatus 10 such as a Basic Input/Output System (BIOS).

The RAM 103 is a volatile main storage device. The RAM 103 is used as the work area for the CPU 101.

The storage drive 104 is a large-capacity non-volatile auxiliary storage device, such as a hard disk drive (HDD), a solid state drive (SSD), and the like. The storage drive 104 stores the received image data, various processing programs described later, setting information, and the like.

The interface 105 includes a local area network (LAN) card and the like, and serves as a repeater that relays communication of the image processing apparatus 10 to and from the image forming apparatus 20, the user terminal 30, or the image reading apparatus 40.

Figure 3:
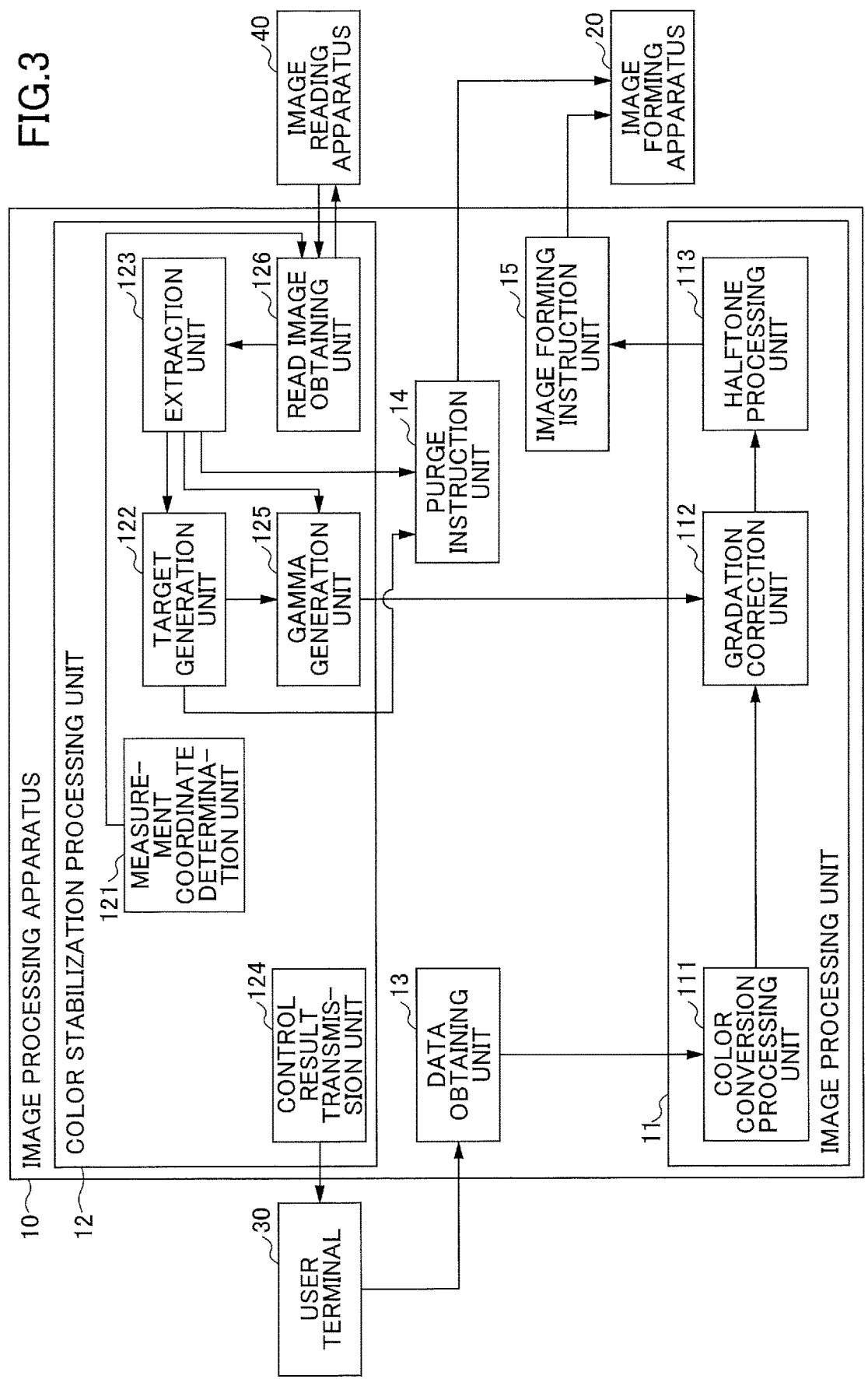
FIG. 3 is a drawing illustrating an example of functions of an image processing apparatus according to the first embodiment.

FIG. 3 is a drawing illustrating an example of functions of an image processing apparatus according to the first embodiment.

The image processing apparatus 10 includes an image processing unit 11, a color stabilization processing unit 12, a data obtaining unit 13, a purge instruction unit 14, and an image forming instruction unit 15.

The data obtaining unit 13 receives job data including image data and print-setting information from the user terminal 30. The image data to be received is, for example, data indicative of an eight-bit color image. The format of the image data may be any of RGB, CMYK, and the like.

The print-setting information is information that is set with regard to image data by the user. Examples of print-setting information include page numbers, the number of copies to be printed, sheets, color profiles, and the like with regard to the image data. The print-setting information includes setting values for a color stabilization function, a purge function, and an automatic re-printing function, which are explained later.

The setting value of the color stabilization function is a value selected by the user with regard to whether to execute color stabilization processing. For example, the setting value of the color stabilization function is either "ON" or "OFF". When the setting value is "ON", the color stabilization processing unit 12 is activated, and when the setting value is "OFF", the color stabilization processing unit 12 is not activated.

The setting value of the purge function is a value selected by the user with regard to the setting of the purge function. For example, the setting value of the purge function is either "ON" or "OFF". When the setting value is "OFF", the purge instruction unit 14 is not activated. When the setting value is "ON", the purge instruction unit 14 is activated. A reference for determining whether the purge instruction unit 14 is activated changes depending on whether the setting value is "ON".

The setting value of the automatic re-printing function is a value selected by the user with regard to whether re-printing is automatically performed when the purge function is activated. For example, the setting value of the automatic re-printing function is either "ON" or "OFF". When the setting value is "ON", the image processing apparatus instructs the image forming apparatus 20 to perform re-printing after the purge instruction unit is activated. When the setting value is "OFF", the image processing apparatus 10 does not instruct the image forming apparatus 20 to perform re-printing.

The image processing unit 11 converts the image data received from the user terminal 30 into image data in a format that can be processed by the image forming apparatus 20. Specifically, the image processing unit 11 includes a color conversion processing unit 111, a gradation correction unit 112, and a halftone processing unit 113.

The color conversion processing unit 111 uses a RIP engine and the like to perform predetermined color conversion processing on CMYK values or RGB values of input image data to convert the image data into image data in a CMYK format compatible with the image forming apparatus 20.

On the basis of gamma data, the gradation correction unit 112 corrects the gradation of the image data converted by the color conversion processing unit 111. When the setting value of the color stabilization function is "OFF", the gradation correction unit 112 uses the gamma data that has been set in advance. The gamma data that has been set in advance may be linear data, and in such a case, the gamma data is substantially left uncorrected. Also, the gamma data may be set in accordance with the performance of the image forming apparatus 20.

When the setting value of the color stabilization function is "ON", the gradation correction unit 112 corrects the gradation of the image data by using the gamma data generated by the gamma generation unit 125. The gradation correction unit 112 stores data indicative of a correction result to the RAM 103 or the storage drive 104.

The halftone processing unit 113 performs processing of halftone color to convert eight-bit image data corrected by the gradation correction unit 112 into two-bit image data.

The image forming instruction unit 15 transmits two-bit image data converted by the halftone processing unit 113 to the image forming apparatus 20 to instruct the image forming apparatus 20 to print the image data.

The color stabilization processing unit 12 achieves the color stabilization function. Specifically, the color stabilization processing unit 12 includes a measurement coordinate determination unit 121, a target generation unit 122, an extraction unit 123, a control result transmission unit 124, a gamma generation unit 125, and a read image obtaining unit 126.

The measurement coordinate determination unit 121 determines values (i.e., measurement coordinate values) indicating the position to be measured in image data, on the basis of image data, information indicating characteristics of sheets included in the print-setting information, and the like. Specifically, the measurement coordinate determination unit 121 determines measurement coordinate values for each page included in the job data, and stores the data indicative of the determined measurement coordinate values to the RAM 103 or the storage drive 104 in association with the job ID and the page number. The measurement coordinate determination unit 121 is an example of a measurement point determination unit. The position indicated by the values (i.e., measurement coordinate values) to be measured in image data is an example of a measurement point.

The read image obtaining unit 126 obtains the image data read by the image reading apparatus 40. Specifically, the read image obtaining unit 126 transmits a signal for requesting the image reading apparatus 40 to read an image, and receives the image data read by the image reading apparatus 40 as a response thereto.

The extraction unit 123 obtains the data indicative of the measurement coordinate values from the measurement coordinate determination unit 121, and extracts a color space value (Lab value) from the read image data, obtained by the read image obtaining unit 126, by measuring the color at the position indicated by the measurement coordinate values.

The target generation unit 122 generates the target data indicative of the target color when the color of the print medium is stabilized. Specifically, the target generation unit 122 generates the target data on the basis of the color space value extracted by the extraction unit 123.

The gamma generation unit 125 generates the gamma data on the basis of the target data generated by the target generation unit 122 and the color space value extracted by the extraction unit 123. Specifically, the gamma generation unit 125 generates the gamma data for performing a gradation correction to cause the printed image to have the same color as the color indicated in the target data, on the basis of a difference value between the color space value and the value of the color indicated by the target data.

The purge instruction unit 14 transmits a signal instructing the image forming apparatus 20 to execute the purge processing, on the basis of the color space value extracted by the extraction unit 123 and the target data generated by the target generation unit 122. Specifically, when the difference value between the color space value and the value of the color indicated by the target data is equal to or more than a threshold value that has been set in advance, the purge instruction unit 14 instructs the image forming apparatus 20 to execute the purge processing.

When the image processing on the job data is completed, the control result transmission unit 124 reads the data indicative of the correction result generated by the gradation correction unit 112 from the RAM 103 or the storage drive 104, and transmits the data to the user terminal 30.

Figure 4:
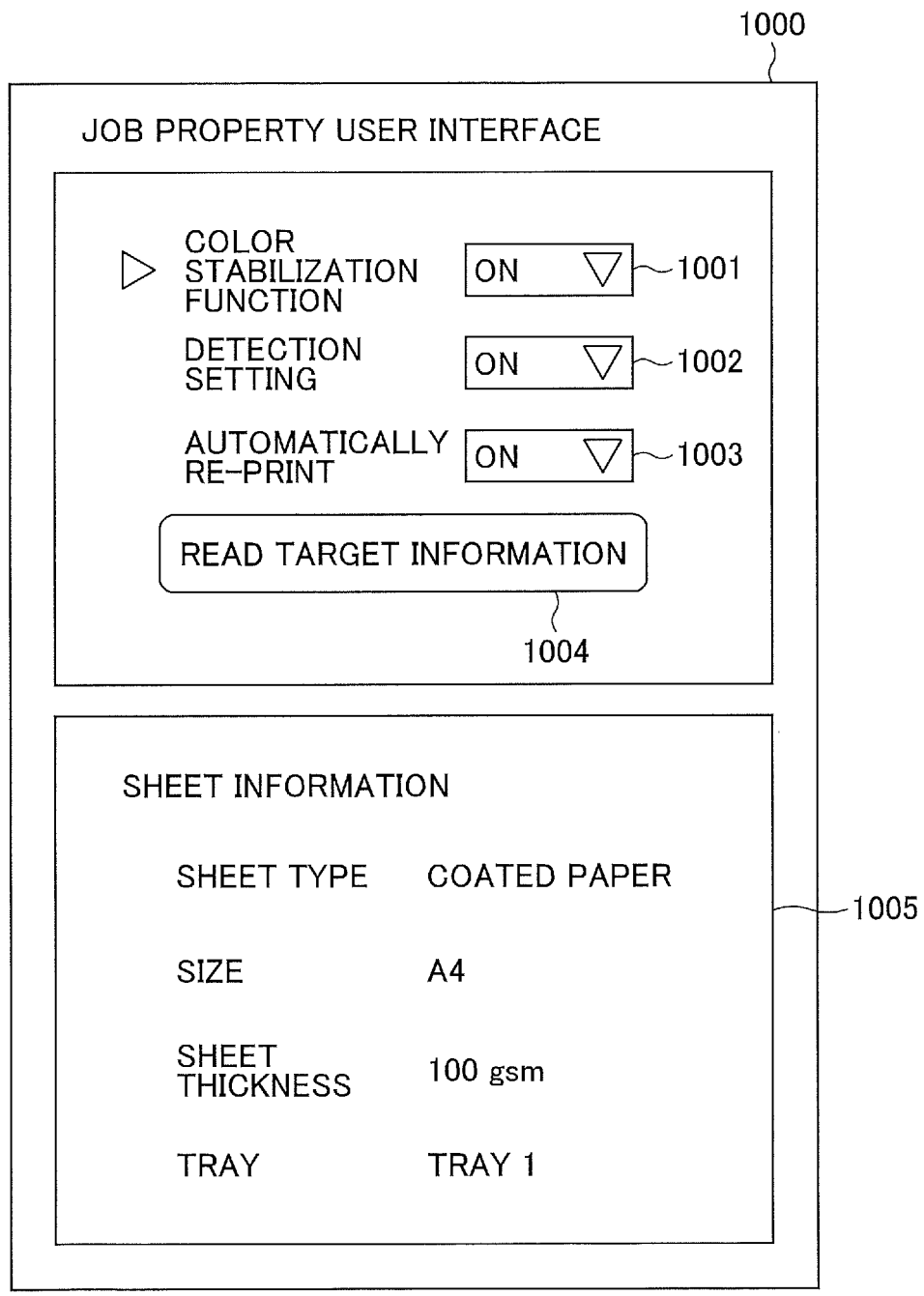
FIG. 4 is a drawing illustrating an example of a print-setting screen according to the first embodiment.

FIG. 4 is a drawing illustrating an example of a print-setting screen 1000 according to the first embodiment.

When the user terminal 30 receives a user's operation for selecting a print function of image data, the user terminal 30 displays the print-setting screen 1000. The print-setting screen 1000 includes a selection field 1001 for the setting value of the color stabilization function, a selection field 1002 for the setting value of the purge function, a selection field 1003 for the setting value of the automatic re-printing function, a target information reading button 1004, and a selection field 1005 for the setting values with regard to sheets.

Next, the operation of the image processing system 1 is explained with reference to drawings.

Figure 5:
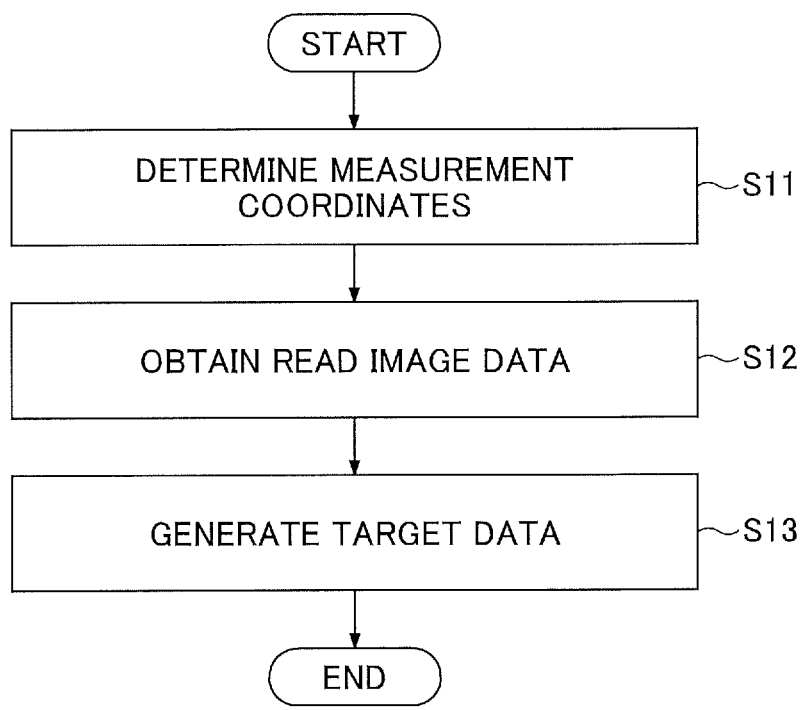
FIG. 5 is an example of a flowchart of correction target generation processing according to the first embodiment.

FIG. 5 is an example of a flowchart of target generation processing according to the first embodiment.

When the target information reading button 1004 is pressed down on the print-setting screen 1000, the user terminal 30 requests the image processing apparatus 10 to start the target generation processing by transmitting, to the image processing apparatus 10, job data including image data and print-setting information indicating information that has been set on the print-setting screen 1000.

When the image processing apparatus 10 receives the job data from the user terminal 30, i.e., receives the request for starting the target generation processing, the image processing apparatus 10 starts the target generation processing of FIG. 5.

The measurement coordinate determination unit 121 of the image processing apparatus 10 analyzes the image data to determine the measurement coordinates (step S11).

Specifically, the measurement coordinate determination unit 121 adopts, as the measurement coordinates, coordinate values of a position where the change in the gradation is gentle and where the reading can be easily performed. For example, the measurement coordinate determination unit 121 calculates the flatness by extracting, from the image data, the pixel values in an area of a size in which the color can be measured. Specifically, for the calculation of the flatness, the measurement coordinate determination unit 121 uses a low-pass filter, Fourier transform, and the like.

The measurement coordinate determination unit 121 adopts, as a position of a high degree of flatness (i.e., a position where the change in the gradation is gentle and where the reading can be easily performed), a position at which a difference between the maximum pixel value and the minimum pixel value is small from among the pixels in the area of the size in which the color can be measured. Then, the measurement coordinate determination unit 121 adopts, as the measurement coordinate values, the coordinate values at the position where the degree of flatness is high.

Measurement coordinate values for a single measurement point may be determined, or measurement coordinate values for multiple measurement points may be determined. When the measurement coordinate determination unit 121 determines measurement coordinate values for multiple measurement points, for example, the measurement coordinate determination unit 121 determines candidates of multiple measurement points so that the measurement positions are evenly taken with respect to the entire image, and the measurement coordinate determination unit 121 may extract the feature quantities of the candidates of multiple measurement positions through clustering or the like and select the candidates accordingly.

Next, the read image obtaining unit 126 obtains read image data (i.e., first read image data) (step S12).

Specifically, it is assumed that the color-calibrated print mediums have been set by the user on the tray in the reading region of the image reading apparatus 40. Preferably, the user generates multiple print mediums by using the image forming apparatus 20, selects a print medium that is printed in a desired color in advance, and sets the selected print medium on the tray that is in the reading region of the image reading apparatus 40.

Then, the read image obtaining unit 126 transmits a signal requesting the image reading apparatus 40 to read the image. When the image reading apparatus 40 receives the signal, the image reading apparatus 40 reads the image printed on the color-calibrated print medium that has been set on the tray, and transmits read image data indicative of the read image to the image processing apparatus 10. The read image obtaining unit 126 receives the read image data.

Next, the target generation unit 122 generates the target data indicative of the target color (step S13). Specifically, the extraction unit 123 obtains data indicative of the measurement coordinate values from the measurement coordinate determination unit 121, and extracts, from the read image data obtained by the read image obtaining unit 126, a color space value (i.e., a LAB value) of the image at the position indicated by the measurement coordinate values.

Then, the target generation unit 122 generates the target data on the basis of the color space value extracted by the extraction unit 123.

Figure 6:
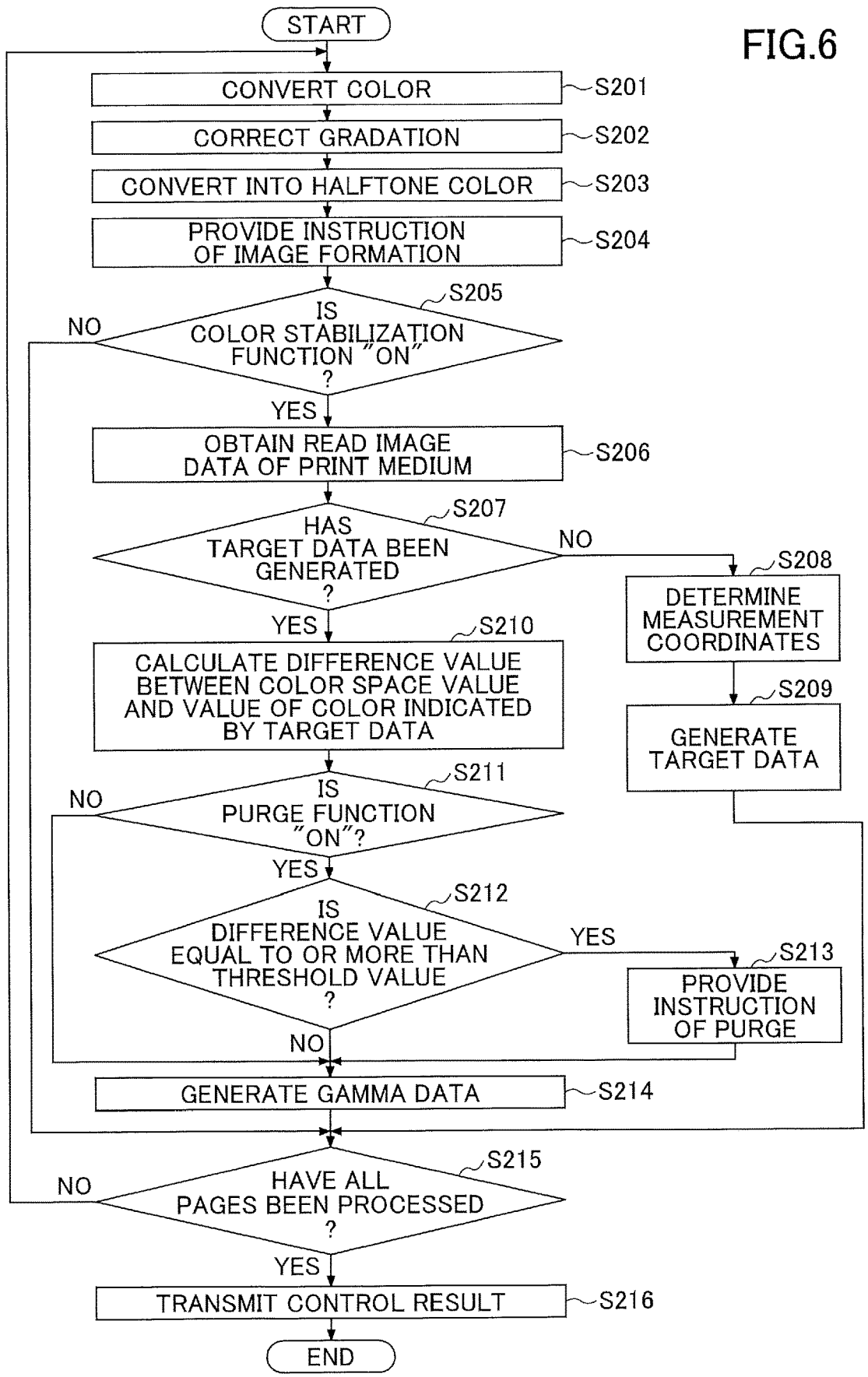
FIG. 6 is an example of a flowchart of image forming instruction processing according to the first embodiment.

FIG. 6 is an example of a flowchart of image forming instruction processing according to the first embodiment.

When the user terminal 30 receives an operation for instructing start of printing, the user terminal 30 requests the image processing apparatus to start the image forming instruction processing by transmitting job data including image data and print-setting information to the image processing apparatus 10.

The image processing apparatus 10 receives the job data including the image data and the print-setting information from the user terminal 30 and receives the request to start the image forming instruction processing, the image processing apparatus 10 starts the image forming instruction processing as illustrated in FIG. 6.

When the image data includes multiple pages, the image processing apparatus 10 executes processing from step S201 to step S215, explained below, on each page.

The color conversion processing unit 111 converts the color of the image data (step S201). Specifically, the color conversion processing unit 111 uses the RIP engine and the like to perform predetermined color conversion processing on CMYK values or RGB values of input image data to convert the image data into image data in a CMYK format compatible with the image forming apparatus 20.

The gradation correction unit 112 corrects the gradation of the image data (step S202). Specifically, the gradation correction unit 112 uses the gamma data to correct the gradation of the image data converted by the color conversion processing unit 111.

When there is gamma data generated by the gamma generation unit 125, the gradation correction unit 112 uses the gamma data generated by the gamma generation unit 125, and when there is no gamma data generated by the gamma generation unit 125, the gradation correction unit 112 uses the gamma data that has been set in advance. The gradation correction unit 112 stores the data indicative of the correction result to the RAM 103 or the storage drive 104.

In the processing of the first page of the job data, the gamma generation unit 125 does not generate any gamma data. Therefore, in at least the processing of the second and subsequent pages, the gamma generation unit 125 may possibly use the gamma data generated by the gamma generation unit 125.

The halftone processing unit 113 performs conversion into the halftone color of the image data (step S203). Specifically, the halftone processing unit 113 converts the eight-bit image data corrected by the gradation correction unit 112 into two-bit image data expressing pseudo halftone colors by a simple binarization method, a density pattern method, a dither method, and the like.

Next, the image forming instruction unit 15 transmits the image data converted by the halftone processing unit 113 to the image forming apparatus 20 to instruct the image forming apparatus 20 to form an image (step S204).

When the image forming apparatus 20 receives an image-forming instruction in the processing of step S204, the image forming apparatus 20 prints image data in processed pages, and conveys the print medium to the reading region of the image reading apparatus 40.

Next, the color stabilization processing unit determines whether the color stabilization function is "ON" by referring to the print-setting information (step S205). When the color stabilization processing unit 12 determines that the color stabilization function is not "ON" (NO in step S205), the processing in step S215 is subsequently performed.

When the color stabilization processing unit 12 determines that the color stabilization function is "ON" (YES in step S205), the read image obtaining unit 126 obtains the read image data (step S206).

Specifically, the read image obtaining unit 126 transmits, to the image reading apparatus 40, a signal for requesting the image reading apparatus 40 to read an image. When the image reading apparatus receives the signal, the image reading apparatus 40 reads the image on the print medium being conveyed, and transmits the read image data indicative of the read image to the image processing apparatus 10. Then, the read image obtaining unit 126 receives the read image data.

For example, when the image data on the first page included in the job data is being processed, the read image data corresponds to data obtained by reading the image on the first page of the print medium.

Next, the color stabilization processing unit determines whether the target data has been generated (step S207). When the color stabilization processing unit 12 determines that the target data has not been generated (NO in step S207), the measurement coordinate determination unit 121 analyzes the image data, and determines the measurement coordinates (step S208). The measurement coordinate determination unit 121 executes this processing of step S208 according to a method similar to the processing of step S12 of the target generation processing explained above.

Next, the target generation unit 122 generates target data indicative of the target color (step S209). The target generation unit 122 executes this processing of step S209 according to a method similar to the processing of step S13 of the target generation processing explained above. Then, the processing in step S215 is subsequently performed.

When the color stabilization processing unit 12 determines that the target data has been generated (YES in step S207), the color stabilization processing unit 12 calculates a difference value between the value of the color indicated by the target data and the color space value (step S210).

Next, the purge instruction unit 14 determines whether the purge function is "ON" by referring to the print-setting information (step S211).

When the purge instruction unit 14 determines that the purge function is not "ON" (NO in step S211), the processing in step S214 is subsequently performed. When the purge instruction unit 14 determines that the purge function is "ON" (YES in step S211), the purge instruction unit 14 determines whether the difference value calculated in step S210 is equal to or more than a threshold value (step S212).

In this case, the setting data indicative of the threshold value is stored in the storage drive 104 in advance. Specifically, respective threshold values, for the case where the setting value of the purge function included in the print-setting information is "ON", are set in the setting data. The threshold values may be included in the print-setting information by being input by the user on the print-setting screen, and.

When the purge instruction unit 14 determines that the difference value is equal to or more than the threshold value (YES in step S212), the purge instruction unit 14 instructs the image forming apparatus 20 to purge (step S213).

When the image forming apparatus 20 receives a purge instruction, the image forming apparatus 20 discharges the print medium, having been conveyed to the reading region of the image reading apparatus 40, to a tray dedicated for purging, i.e., to a discharge destination that is different from the designated discharge destination included in the print-setting information.

Subsequently to the processing of step S213 or when the purge instruction unit 14 determines that the difference value is less than the threshold value (NO in step S212), the gamma generation unit 125 generates the gamma data (step S214). Specifically, the gamma generation unit 125 generates the gamma data for performing a gradation correction to cause the printed image to have the same color as the color indicated in the target data, on the basis of the difference value calculated in step S210.

The gamma data generated in step S214 is used by the gradation correction unit 112 in the processing of step S202 for subsequent pages.

When the read image data obtained in step S206 is used for generating the target data in step S208 and step S209 explained above, the read image data functions as the first read image data. When the read image data obtained in step S206 is used for determining whether to execute the purge function or for generating the gamma data in the processing from step S210 to step S214 explained above, the read image data functions as the second read image data.

Next, the image processing apparatus 10 determines whether all the pages included in the job data have been processed (step S215). When the image processing apparatus 10 determines that there are pages that have not yet been processed (NO in step S215), the image processing apparatus 10 returns back to the processing of step S201 to execute processing for a subsequent page included in the job data.

When the image processing apparatus 10 determines that all the pages included in the job data have been processed (step S215), the image processing apparatus 10 transmits, to the user terminal 30, data indicative of the control result of the gradation correction unit 112 stored in the RAM 103 or the storage drive 104 (step S216).

When the user terminal 30 receives the data indicative of the control result, the user terminal 30 displays a control result screen.

Figure 7:
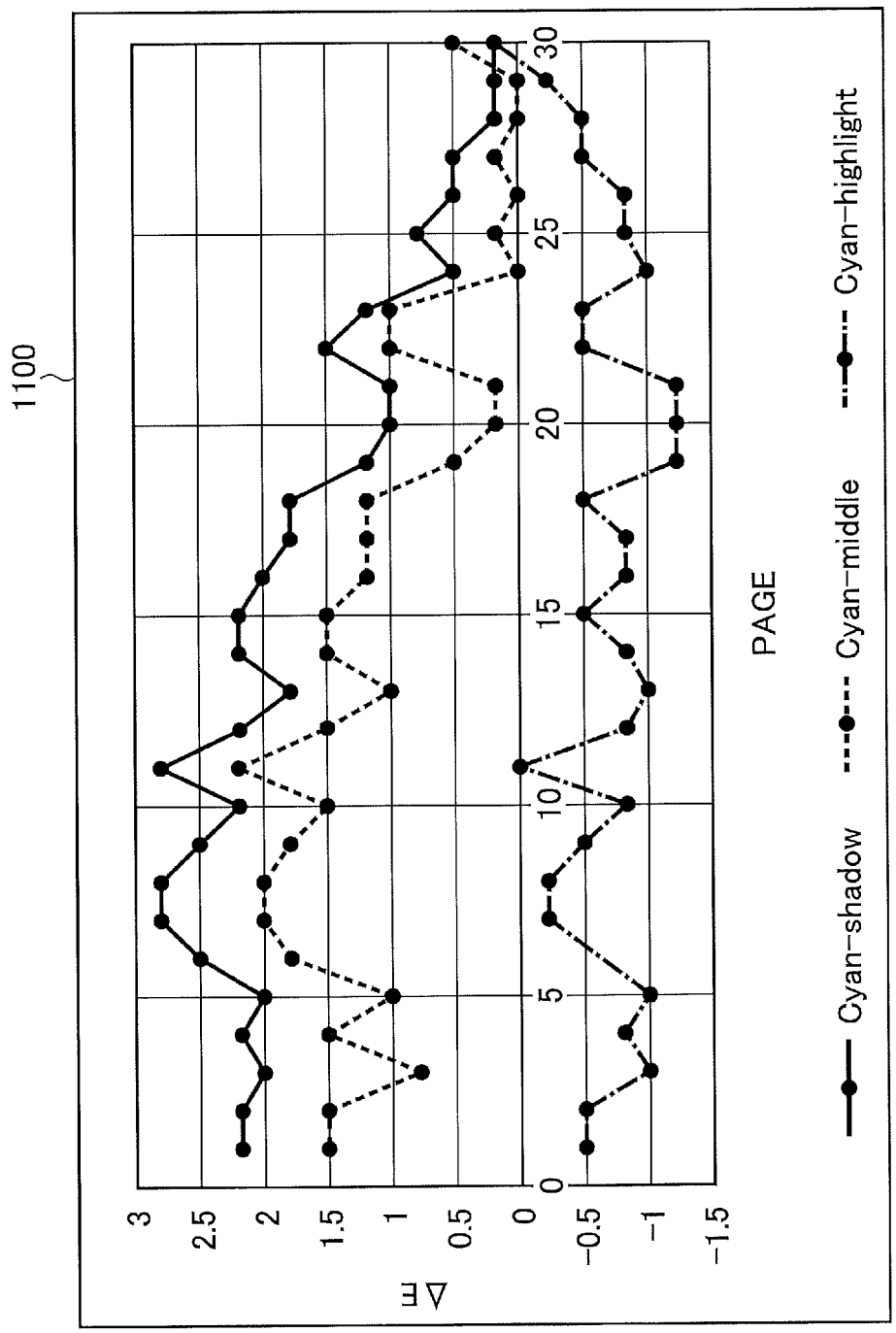
FIG. 7 is a drawing illustrating an example of a control result screen according to the first embodiment.

FIG. 7 is a drawing illustrating an example of a control result screen according to the first embodiment.

A control result screen 1100 displays a result of correction made by the gradation correction unit 112. For example, the control result screen 1100 displays, in a graph format, how a color difference ($\Delta E$) between the color space value and target data changes across pages. The user can grasp that the color difference changes across pages, and can ascertain that the gradation correction is effectively performed.

For example, conventionally, if the gradation correction unit 112 uses the target data defined in advance, the gradation correction unit 112 may correct image data into an excessively narrow color reproduction range in which the performance of the image forming apparatus 20 cannot be sufficiently achieved, or conversely, the gradation correction unit 112 may correct image data into an excessively wide color reproduction range that is beyond the performance of the image forming apparatus 20.

In contrast, with the image processing system 1 according to the present embodiment, the print medium printed in the desired color by the image forming apparatus 20 is read by the image reading apparatus 40, and the target data indicative of the target color is generated on the basis of the read image data indicative of the image that has been read. Therefore, the gradation correction unit 112 can correct image data into a color reproduction range of an appropriate size by using the target data suitable for the performance of the image forming apparatus 20.

Instead of reading print mediums printed by the image forming apparatus 20, the image reading apparatus 40 may read a print medium of which the color has been calibrated by the user, and the image processing apparatus 10 may be caused to generate the target data indicative of the target color on the basis of the read image data indicative of the image that has been read. In this case, the desired color of the user is more likely to be reproduced.

Also, with the purge function, a print medium with a great color difference (i.e., a large difference value of color) from the target color may be discharged to a discharge destination that is different from the specified discharge destination.

In the image forming instruction processing explained above, when the user sets the setting value of the automatic re-printing function to "ON" in the print-setting screen 1000, the purge instruction unit 14 stores the data indicative of the purged pages to the RAM 103 or the storage drive 104 in the processing of step S213. Then, before the image forming instruction processing of step S216, the processing from step S201 to step S204 is executed on the basis of the data indicative of purged pages stored in the RAM 103 or the storage drive 104.

In this case, the image on the page, which has been purged with the purge function, can be separately printed on the basis of the gamma data for the processing of the final page.

In the above-explained example, in the image forming instruction processing explained above, when the target data is not generated, the target data is generated on the basis of the first page of the print medium in the print job. Alternatively, instead of the first page, the target data may be generated on the basis of, for example, the fifth page, the tenth page, and the like.

Also, a setting may be performed so as to use a desired n-th page of the print medium. For example, how many pages the image forming apparatus 20 needs to print to attain a stable operation may be evaluated based on the performance, and a setting for using a desired n-th page of the print medium may be performed based on the evaluation result.

Second Embodiment

The second embodiment is hereinafter explained with reference to drawings. The second embodiment is different from the first embodiment in that the measurement coordinates are set by the user. In the following explanation about the second embodiment, the difference from the first embodiment is explained, constituent elements similar to the constituent elements of the first embodiment are denoted with reference numerals similar to the reference numerals used in the first embodiment, and explanation thereabout is omitted.

Figure 8:
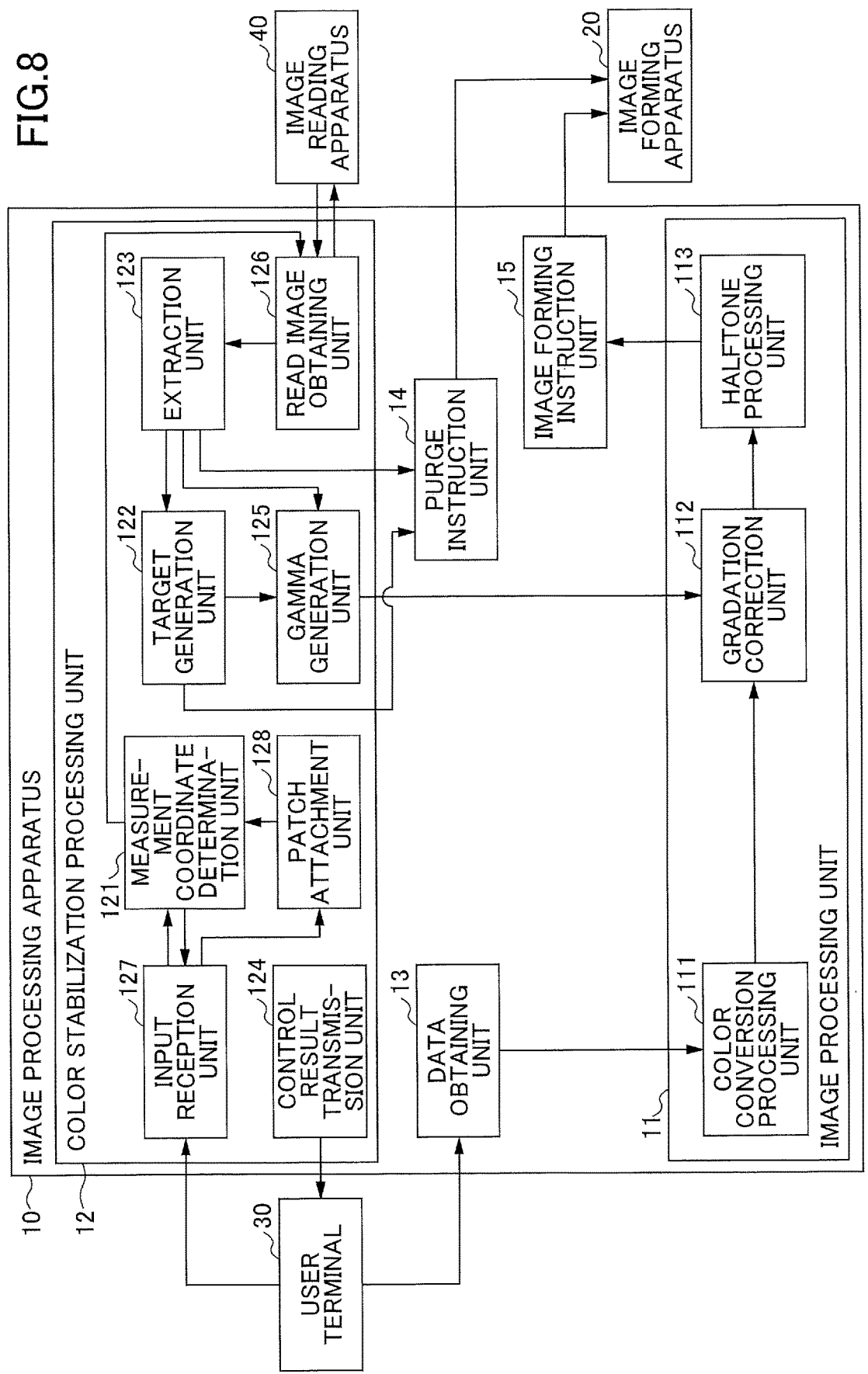
FIG. 8 is a drawing illustrating an example of functions of an image processing apparatus according to a second embodiment.

FIG. 8 is a drawing illustrating an example of functions of an image processing apparatus according to the second embodiment.

The color stabilization processing unit 12 of the image processing apparatus 10 according to the present embodiment further includes an input reception unit 127 and a patch attachment unit 128.

The input reception unit 127 transmits, to the user terminal 30, data indicative of the measurement coordinate values (i.e., measurement coordinate data) tentatively determined by the measurement coordinate determination unit 121. Then, the input reception unit 127 receives, from the user terminal 30, the user-specified measurement coordinate data determined by the user and color-of-interest setting data indicative of a setting value of a color which the user is interested in, and transmits the user-specified measurement coordinate data and the color-of-interest setting data to the measurement coordinate determination unit 121.

When measurement cannot be performed at the position indicated by the user-specified measurement coordinate data, and the setting value of the color-of-interest setting data is "ON", the patch attachment unit 128 attaches a color patch to image data.

Figure 9:
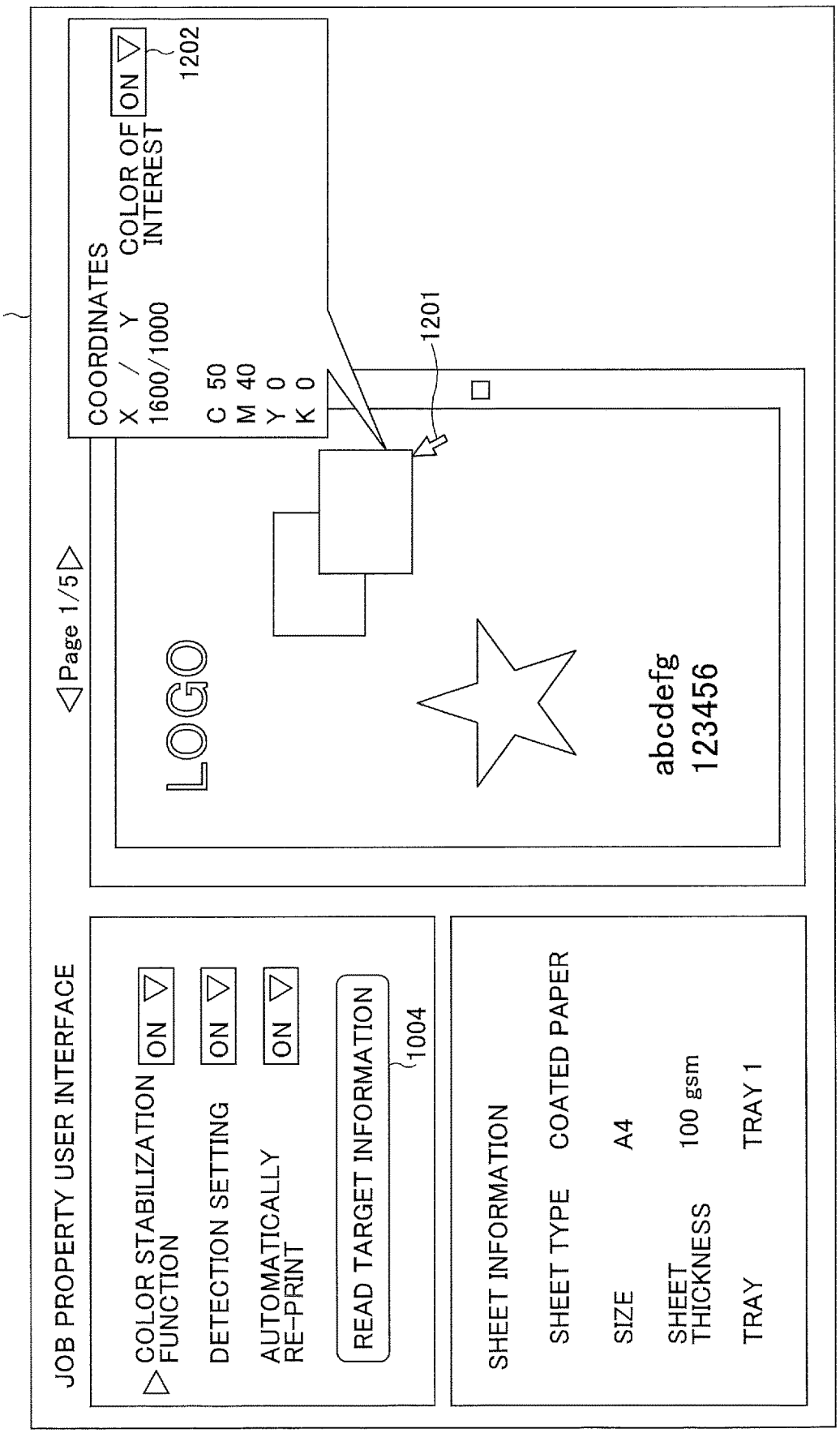
FIG. 9 is a drawing illustrating an example of a print-setting screen according to the second embodiment.

FIG. 9 is a drawing illustrating an example of a print-setting screen 1200 according to the second embodiment.

The print-setting screen 1200 according to the present embodiment includes: a cursor 1201 indicating the position of the measurement coordinates on the image in a superimposed manner; and a selection field 1202 allowing the user to select either "ON" or "OFF" as the setting value of the color-of-interest.

The print-setting screen 1200 displays, for each page, an image included in the print image data. When the image data includes multiple pages, the print-setting screen 1200 may include a graphical user interface (GUI) such as buttons for switching the displayed page. In such case, the measurement coordinate values are determined for each page.

The cursor 1201 is a GUI with which the user sets the position of the measurement coordinates. In addition, the setting value of the color-of-interest indicates whether the user specifies the color of the image at the position of the measurement coordinates as a color which the user is particularly interested in.

When the target information reading button 1004 is pressed down, or when an instruction to start printing is given, the user terminal 30 transmits, to the image processing apparatus 10, data indicative of the measurement coordinate values indicated by the cursor 1201 and the setting value of the color-of-interest indicated by the selection field 1202.

Next, the operation of the image processing apparatus 10 according to the present embodiment is explained with reference to drawings.

Figure 10:
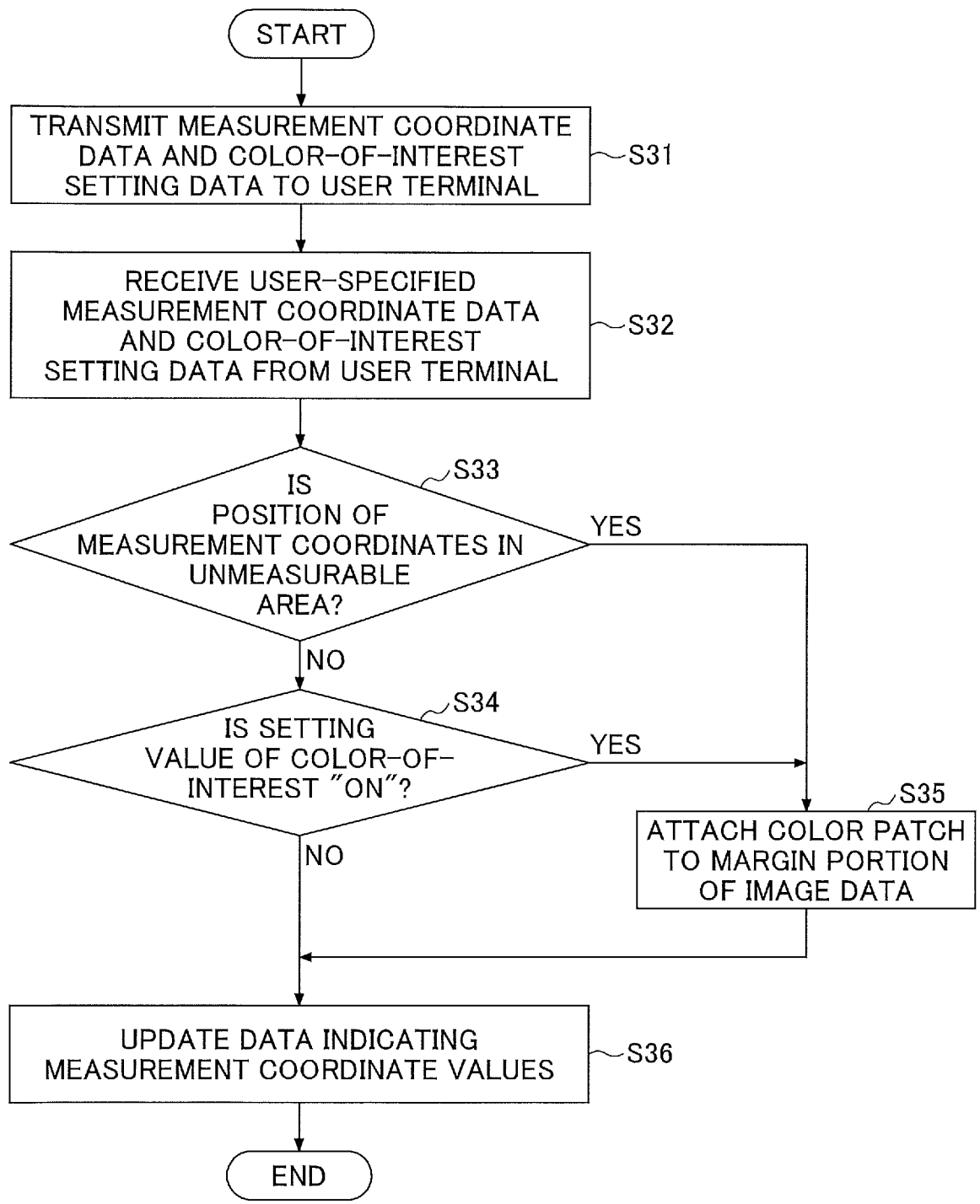
FIG. 10 is an example of a flowchart of measurement coordinate determination processing according to the second embodiment.

FIG. 10 is an example of a flowchart of measurement coordinate determination processing according to the second embodiment.

When the image processing apparatus 10 determines the measurement coordinates in the target generation processing of step S11, the image processing apparatus 10 stores data indicative of measurement coordinate values to the storage drive 104 and executes the measurement coordinate determination processing. In the present embodiment, in step S11 of the target generation processing, the measurement coordinates are provisionally determined, and the measurement coordinates are ultimately determined in this measurement coordinate determination processing.

When the image processing apparatus 10 starts the measurement coordinate determination processing, the input reception unit 127 transmits the measurement coordinate data and the color-of-interest setting data to the user terminal 30 (step S31). Then, the input reception unit 127 receives the user-specified measurement coordinate data and the color-of-interest setting data from the user terminal 30 (step S32).

Next, the input reception unit 127 determines whether the position of the measurement coordinates is in an unmeasurable area (step S33). The unmeasurable area is an area of the image indicated by the image data where the precision of the color space value extracted by reading the image is too low to correctly perform the measurement.

Specifically, the input reception unit 127 analyzes the color of the pixel at the position of the measurement coordinates and colors of surrounding pixels around the pixel at the position of the measurement coordinates, and when the color difference from the surrounding pixels is great, the input reception unit 127 determines that the position of the measurement coordinates is in the unmeasurable area. This is because, when the color difference from the surrounding pixels is great, a completely different result is obtained with a slight shift in the measurement position, and accordingly, it is highly likely that accurate measurement cannot be performed in a stable manner.

When the input reception unit 127 determines that the position of the measurement coordinates is in the unmeasurable area (YES in step S33), the patch attachment unit 128 attaches a color patch to a margin portion of the image data (step S35). Specifically, the patch attachment unit 128 obtains, from the image data, a value indicating a color of an image corresponding to the position of the measurement coordinates, and attaches the color patch in the color indicated by the obtained value.

The measurement coordinate determination unit 121 updates the data indicative of the measurement coordinate values stored in the storage drive 104 (step S36). Specifically, the measurement coordinate determination unit 121 adopts, as the updated position of the measurement coordinates, the position where the color patch has been added by the patch attachment unit 128. Note that, because the position of the measurement coordinates is in the unmeasurable area, the position of the measurement coordinates indicated by the data received from the user terminal 30 are not used.

When, in the processing of step S33, the input reception unit 127 determines that the position of the measurement coordinates is not in the unmeasurable area (NO in step S33), the input reception unit 127 determines whether the setting value of the color-of-interest is "ON" (step S34).

When the input reception unit 127 determines that the setting value of the color-of-interest is "ON" (YES in step S34), the input reception unit 127 executes the processing of step S35 and step S36. In this case, in the processing of step S35, the patch attachment unit 128 attaches a color patch to each page in the same job data. Then, in the processing of step S36, with respect to all the pages, the measurement coordinate determination unit 121 adopts, as the updated position of the measurement coordinates, the position where the color patch has been added by the patch attachment unit 128.

Conversely, when the input reception unit 127 determines that the setting value of the color-of-interest is not "ON" (NO in step S34), the input reception unit 127 executes the processing of step S36. In this case, in the processing of step S36, the measurement coordinate determination unit 121 adopts, as the updated position of the measurement coordinates, the position of the measurement coordinate indicated by the data received from the user terminal 30.

With the image processing system 1 according to the present embodiment, the user specifies the position of the measurement coordinates, and the image at the specified measurement coordinates is read to generate the target data and making comparison with the target data. Therefore, the color stabilization control can be performed while reflecting the user's intention.

In addition, the image processing system 1 according to the present embodiment receives the color-of-interest that is set by the user, attaches the color patch, and reads the attached color patch to generate the target data and making comparison with the target data. Therefore, the color stabilization control can be performed while specializing in the color which the user is interested in.

The image forming apparatus 20 according to each of the embodiments explained above may be an electrophotographic type or an inkjet type. The image forming apparatus 20 may have the function of the image processing apparatus 10 according to the present embodiment.

The image processing system 1 according to each of the embodiments explained above may further include a management server. In such case, the management server receives job data from the user terminal 30, and adds the job data as a queue in a storage unit that stores job data queued for printing. Then, the management server extracts job data from the queue in the order of addition to the queue or in the order of priority defined as appropriate, and transmits the extracted job data to the image processing apparatus 10.

With the image processing system 1 according to each of the embodiments explained above, any color is allowed to be specified as the target color of a print medium.

The functions of the embodiments explained above can be achieved by one or more processing circuits. In this case, the "processing circuit" in the present specification includes a processor programmed to execute the functions with software such as a processor implemented by an electronic circuit, and devices such as an application specific integrated circuit (ASIC), a digital signal processor (DSP), a field programmable gate array (FPGA), conventional circuit modules, and the like, designed to execute the functions explained above.

Although the present invention has been hereinabove explained on the basis of the embodiments, the present invention is not limited to the particulars of the described examples. These features can be made without departing from the scope of the claimed subject matter, and can be appropriately determined according to the form of application.

What is claimed is:

1. An image processing apparatus, comprising:
   read image obtaining circuitry configured to obtain read image data indicative of an image which was read;
   target generation circuitry configured to generate, based on the read image data, target data indicative of a target color of a print medium;
   gradation correction circuitry configured to correct, based on the target data, a gradation of print image data indicative of an image to be formed;
   measurement point determination circuitry configured to determine a measurement point in the read image data, based on the print image data; and
   extraction circuitry configured to extract a color space value by measuring a color at the measurement point,
   wherein the target generation circuitry generates the target data, based on the color space value extracted by the extraction circuitry.

2. The image processing apparatus according to claim 1, further comprising:
   input reception circuitry configured to receive user-specified measurement point data indicative of a user-specified measurement point in the read image data that is specified by a user,
   wherein the extraction circuitry extracts the color space value by measuring a color at the user-specified measurement point.

3. The image processing apparatus according to claim 2, further comprising:
   patch attachment circuitry configured to attach a color patch to the read image data, when the color cannot be measured at the user-specified measurement point.

4. The image processing apparatus according to claim 3, wherein the input reception circuitry further obtains a setting value indicating whether the color at the user-specified measurement point is of an interest of the user,
   wherein when the setting value indicates that the color at the user-specified measurement point is of the interest of the user, the patch attachment circuitry attaches the color patch to respective pages included in the read image data.

5. An image processing apparatus, comprising:
   read image obtaining circuitry configured to obtain read image data indicative of an image which was read;
   target generation circuitry configured to generate, based on the read image data, target data indicative of a target color of a print medium; and
   gradation correction circuitry configured to correct, based on the target data, a gradation of print image data indicative of an image to be formed,
   wherein the read image data is first read image data, and the read image obtaining circuitry further obtains second read image data indicative of an image obtained by reading the print medium printed based on the print image data,
   wherein the image processing apparatus further comprises:
   gamma generation circuitry configured to generate gamma data serving as a basis of the correcting of the gradation of the print image data, based on the target data and the second read image data,
   wherein the gradation correction circuitry corrects the gradation of the print image data, based on the gamma data.

6. The image processing apparatus according to claim 5, further comprising:
   purge instruction circuitry configured to instruct an image forming apparatus to convey the print medium, from which the second read image data has been read, to a discharge destination different from a specified discharge destination, based on the target data and the second read image data.

7. The image processing apparatus according to claim 6, further comprising:
   image forming instruction circuitry configured to instruct the image forming apparatus to form an image corresponding to an image to be formed on the print medium discharged to the discharge destination different from the specified discharge destination by the purge instruction circuitry.

8. An image processing method comprising:
obtaining read image data indicative of an image having been read;
generating target data indicative of a target color of a print medium, based on the read image data; and
correcting a gradation of print image data indicative of an image to be formed, based on the target data;
determining a measurement point in the read image data, based on the print image data; and
extracting a color space value by measuring a color at the measurement point,
wherein the target data is generated based on the color space value which has been extracted.

9. A non-transitory computer-readable recording medium recorded with a program causing a computer to execute the image processing method set forth in claim 8.

* * * * *